UNITED STATES PATENT OFFICE.

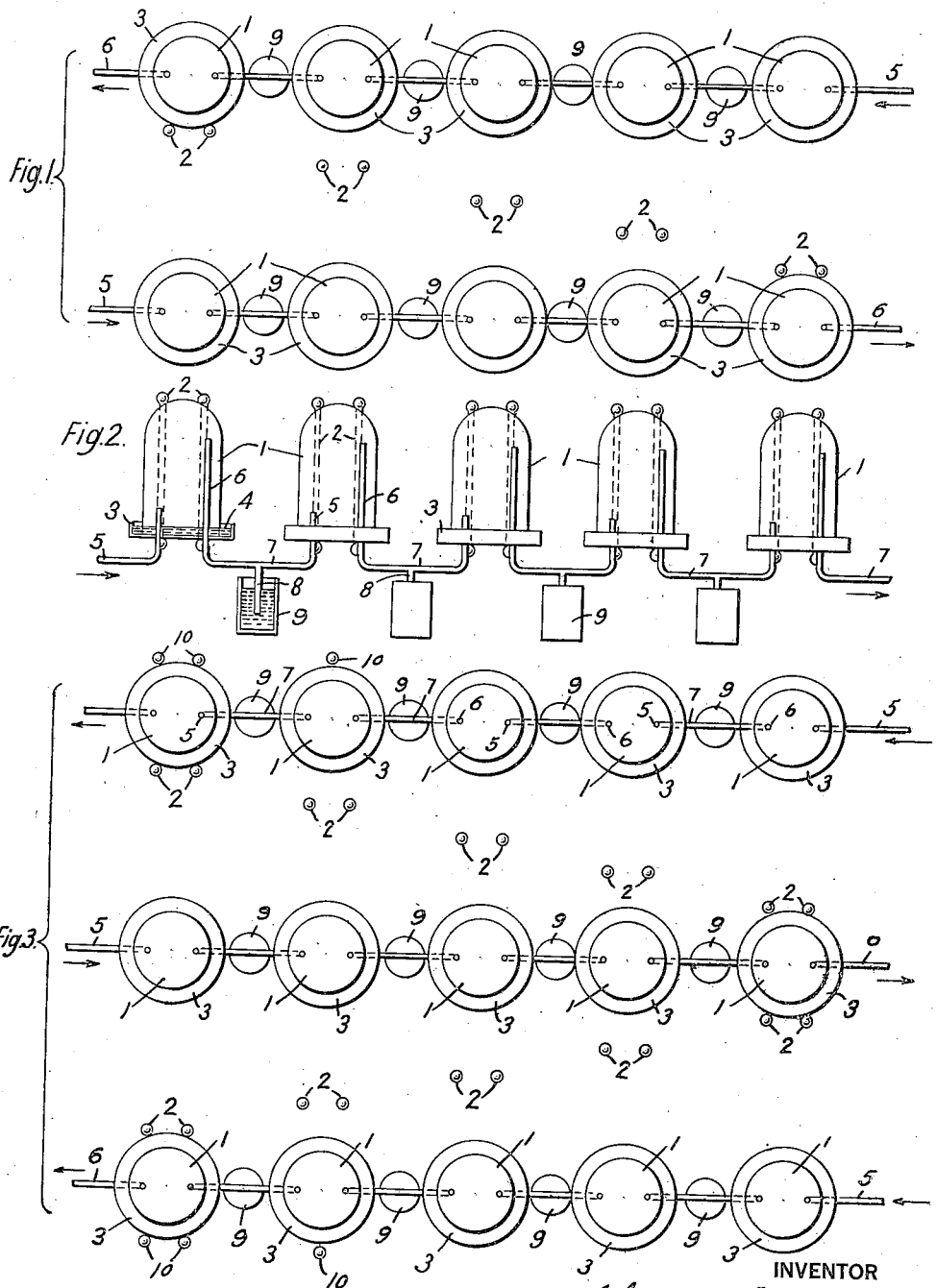

WALTER O. SNELLING, OF ALLENTOWN, PENNSYLVANIA.

PHOTOCHEMICAL APPARATUS.

1,339,675.

Specification of Letters Patent.  Patented May 11, 1920.

Application filed March 1, 1917. Serial No. 151,793.

*To all whom it may concern:*

Be it known that I, WALTER O. SNELLING, a citizen of the United States, and a resident of Allentown, in the county of Lehigh and State of Pennsylvania, have invented a new and useful Improvement in Photochemical Apparatus, of which the following is a specification.

My invention relates to chemical reactions which involve the exposure of mixtures of photochemically reactive gases or vapors to actinic rays for the production of compounds such as halogen substitution products of hydrocarbons, among which may be mentioned, for example, carbon tetrachlorid, chloroform, methlyene chlorid, methyl chlorid, ethane chlorids, ethylene chlorids, the bromin and iodin substitution products of the hydrocarbons mentioned, and many others.

The object of my invention is to provide simple and effective apparatus for carrying out photochemical reactions, of the character indicated above, upon a commercial scale and with economical utilization of actinic energy. By way of illustration, but without limiting my invention to the structures shown, two systems embodying my invention are set forth in the accompanying drawing, in which:

Figure 1 is a diagrammatic plan view of a set of photochemical apparatus including two parallel rows of transparent reaction vessels with light sources arranged between the rows. Fig. 2 is a diagrammatic side elevational view, with parts in section, of the apparatus of Fig. 1, and Fig. 3 is a diagrammatic plan view, similar to Fig. 1, but showing a set of three rows of reaction vessels having light sources associated therewith in accordance with my invention.

Reactions which are produced or accelerated by actinic light rays usually tend to proceed with explosive violence, as when chlorin is mixed with hydrogen or methane and exposed to direct sunlight or to the rays of a strongly actinic electric lamp, and reactions of this character, therefore, are not technically useful unless means are provided for materially reducing the reaction velocity. One method which has been tried for this purpose consists in passing the reaction mixture of gases or vapors through a series of tubes which are exposed to a source of light and which are provided with semi-transparent varnish coatings of varying degrees of opaqueness, the most opaque tube or portion of tube being presented to the entering gases, and the tubes becoming progressively more transparent. On account of the use of opaque or semi-opaque tubes, this system is very wasteful of light, the rays which are interrupted by the varnished portions of the reaction conduits being entirely useless.

The apparatus which forms the subject of my present invention may be regarded as an improvement upon the varnished-tube apparatus mentioned above, and consists of one or more series of transparent reaction vessels, of tubular or any other desired form, through which the mixture of reactive gases or vapors is passed, and in which the reaction mixture is exposed to light of progressively increasing intensity. The reaction vessels are all equally transparent, and the variation in the intensity of the light in the various vessels is produced by disposing light sources at different distances from the vessels, in accordance with the amount of light which each vessel is to receive. In order to economize the light, I prefer to make use of two or more rows of reaction vessels, the light sources being disposed between the rows and diagonally arranged with respect thereto, and I pass the reaction mixture through the adjacent rows of vessels in opposite directions, introducing the mixture first into the vessel of each row which is farthest from the adjacent light source and withdrawing the reaction products finally from the vessel which is nearest the light source adjacent to it.

The arrangement described above may be further explained by reference to the accompanying drawing, Fig. 1 of which shows diagrammatically a system comprising two parallel rows of transparent reaction tubes or other vessels 1, between which are disposed a series of light sources represented by mercury vapor lamps 2. Lamps of any other desired type capable of emitting actinic rays may be employed, and the vessels 1 may take any desired form. For convenience, but without limiting my invention to this form of device, I have shown the vessels 1 in Fig. 2 as being of the kind described in my copending application for Letters Patent, Serial No. 132,869, filed November 22, 1916, each consisting of a seamless glass dome resting upon a shallow pan or tray 3 containing sealing liquid 4 and provided with inlet and outlet pipes 5 and 6, respectively. Between each outlet pipe 6 and the adjacent inlet pipe 5 of the next dome is a connecting pipe 7, in which is inserted a drip pipe 8 for draining off condensed reaction products, which are received in a container 9.

It will be observed, in Fig. 1, that the lamps 2 at the left of this figure are nearest the dome 1 adjacent to the outlet end of the upper series of domes, and are as far as possible from the dome at the inlet or left-hand end of the lower series of domes; while the lamps at the right of this figure are oppositely located with respect to the domes of the upper and lower set. The lamps opposite to the intermediate domes are disposed at progressively varying distances from the domes, the result being that reaction mixtures introduced at the right of the upper series of domes and at the left of the lower series will receive similar amounts of light during their progress through the domes, the light being gradually increased as the reaction proceeds, but never becoming sufficiently intense to raise the temperature of the reacting gases to the ignition point. If desired, the lamps 2 may be mounted upon movable supports, in order that they may be adjusted toward and away from the adjacent domes to correct local irregularities in the course of the reaction.

The system shown in Fig. 3 is similar in most respects to the system of Fig. 1, and the corresponding parts are similarly designated. In Fig. 3, however, three rows of domes are shown, with two sets of intermediate light sources converging toward the inlet dome at the right of the middle row of domes. It will be evident that an evenly progressive illumination of the several sets of domes is produced by this arrangement, and that the number of sets of domes may be increased indefinitely. In order to intensify the illumination within the outlet domes of the upper and lower rows, I prefer to provide auxiliary lamps 10 adjacent to these domes, thereby causing them to be illuminated as brightly as the outlet domes of the central row.

Another variation of the systems herein shown may be made by arranging several series of reaction domes, in radial relation to a common outlet, a suitable number of light sources being provided between each pair of adjacent series of vessels and equidistant therefrom. The principles of my invention may be employed in many other systems in addition to those which I have specifically shown and described, and apparatus operating upon these principles may be combined with other structures in a wide variety of ways. It is therefore to be understood that no limitations are to be imposed upon my invention except such as are indicated in the appended claims.

I claim as my invention:

1. Photochemical apparatus comprising a series of transparent reaction vessels connected by fluid conduits, means for causing reactive fluids to progressively pass through the series of vessels, and a light source opposite to each of the said reaction vessels, the said light sources being disposed at progressively decreasing distances from the said vessels in the direction of flow of the reactive material.

2. Photochemical apparatus comprising a plurality of spaced series of transparent reaction vessels, the vessels composing each of the said series being connected by inlet and outlet conduits, and a series of light sources disposed between the said series of reaction vessels, each of the said light sources being opposite to one of the reaction vessels of each adjacent series.

3. Photochemical apparatus comprising a plurality of spaced and substantially parallel series of transparent and alined reaction vessels and a series of light sources disposed diagonally between the adjacent series of reaction vessels, whereby the reaction vessels composing each series receive light of progressively varying intensity.

4. Photochemical apparatus comprising a plurality of spaced series of transparent reaction vessels, means for passing reactive fluids through the said series of vessels, and a plurality of light sources so disposed between the said series of vessels as to project light of maximum intensity upon the outlet vessel of each series, and to project progressively diminishing amounts of light upon the other vessels of each series.

5. Photochemical apparatus comprising three spaced and substantially parallel series of transparent reaction vessels, means for passing reactive fluids through each of the said series of vessels, and two series of light sources disposed diagonally between the said series of reaction vessels and adapted to project light of maximum intensity upon the outlet vessel of each series, and to project progressively diminishing amounts of light upon the other vessels of each series.

6. Photochemical apparatus comprising three spaced and substantially parallel series of transparent reaction vessels, means for passing reactive fluids through each of the said series of vessels, two series of light sources disposed diagonally between the said series of reaction vessels and converging toward the outlet reaction vessel of the central series, and an auxiliary light source disposed adjacent to one or more of the reaction vessels of the outer series.

In testimony whereof I have hereunto subscribed my name this 27th day of February, 1917.

WALTER O. SNELLING.